E-47 SR
FIP8309 OR RE 23,955
SEARCH ROOM
BEST AVAILABLE COPY
March 1, 1955 S. A. GREEN Re. 23,955
DAVENPORT BED Orig. 2628,267
Original Filed April 21, 1951 4 Sheets-Sheet 1
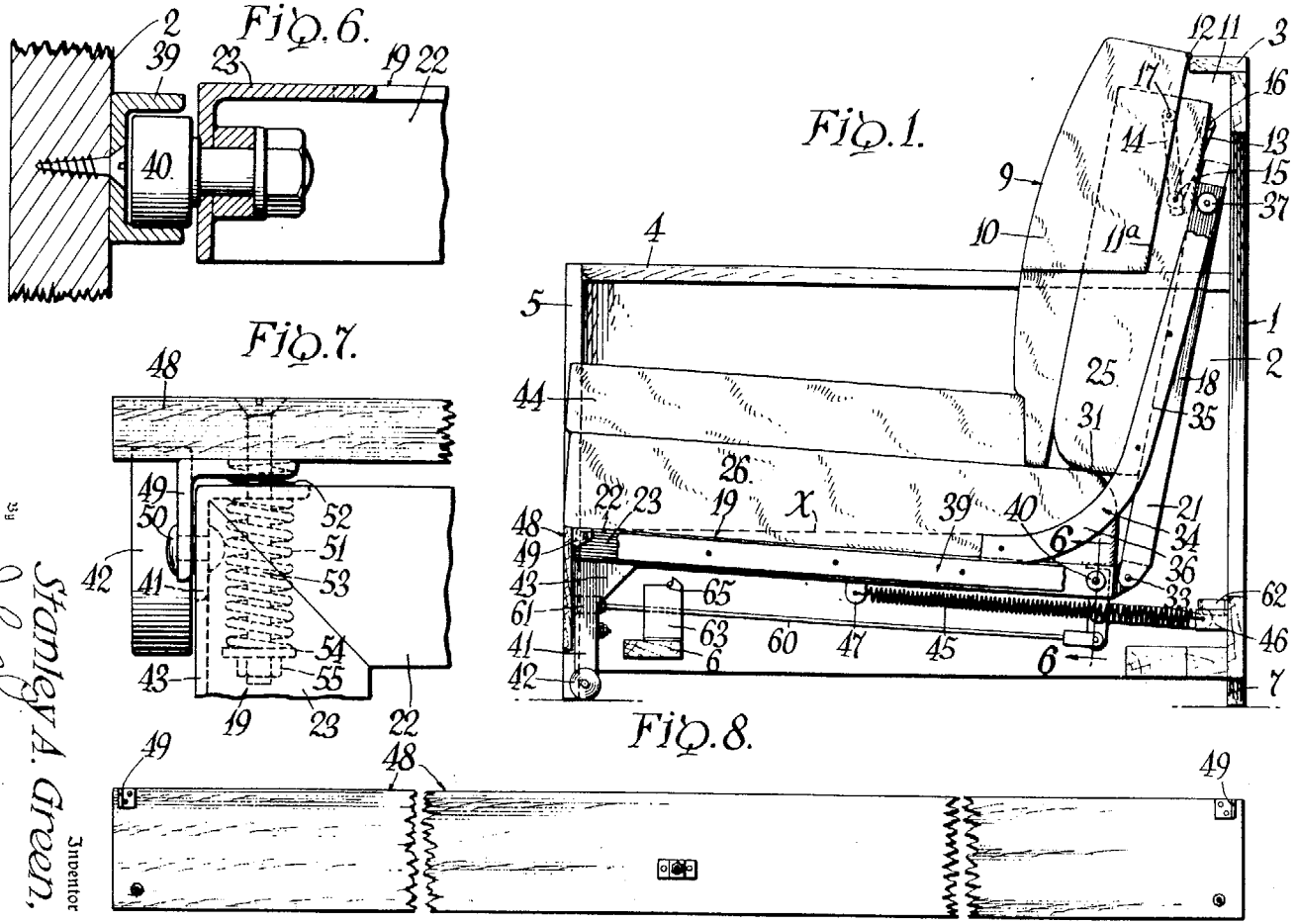
Inventor
Stanley A. Green,
By John Lowers
Attorney March 1, 1955 S. A. GREEN Re. 23,955
DAVENPORT BED
Original Filed April 21, 1951 4 Sheets-Sheet 2
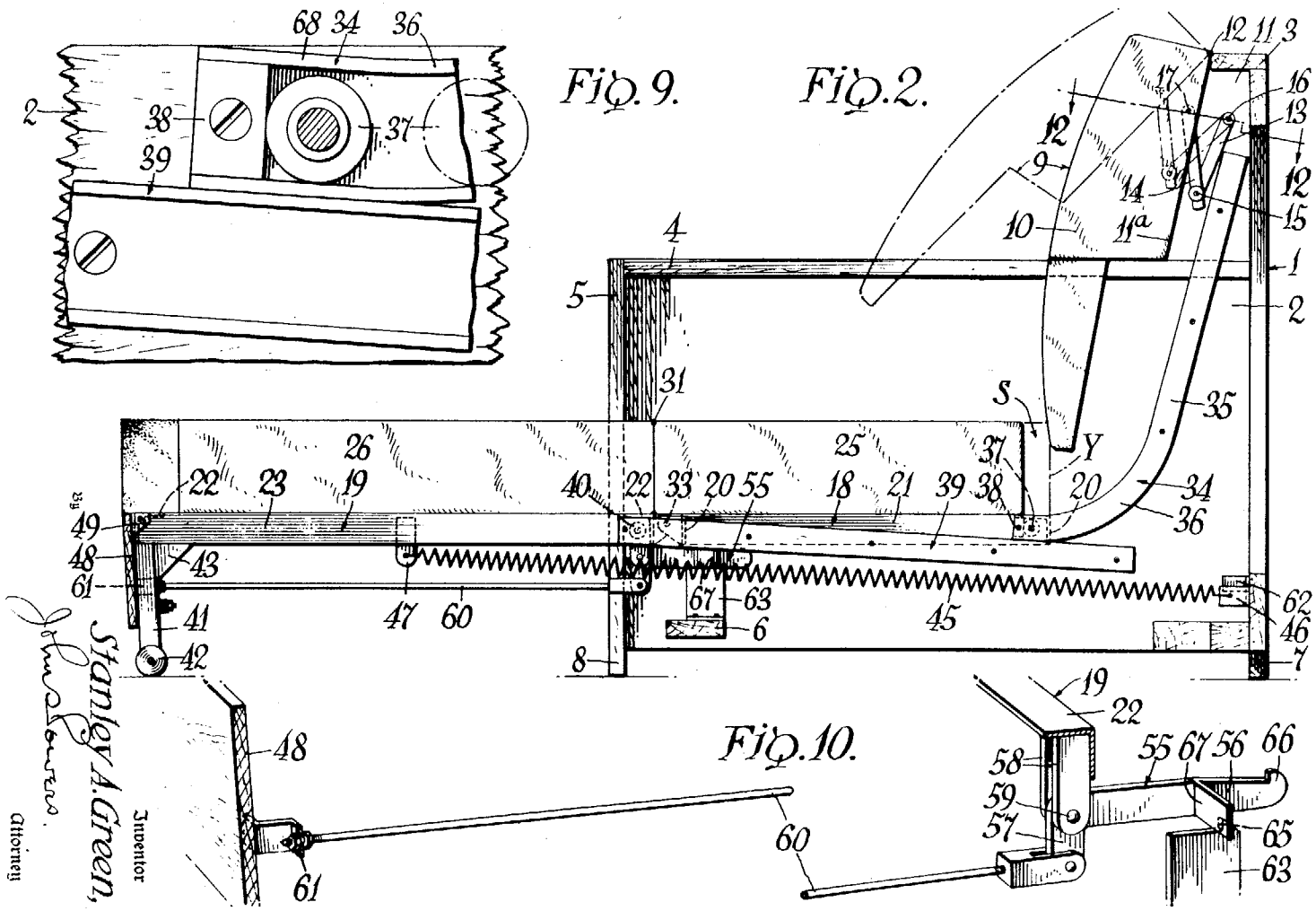
Inventor
Stanley A. Green,
By John S. Powers.
Attorney March 1, 1955 S. A. GREEN Re. 23,955
DAVENPORT BED
Original Filed April 21, 1951 4 Sheets-Sheet 3
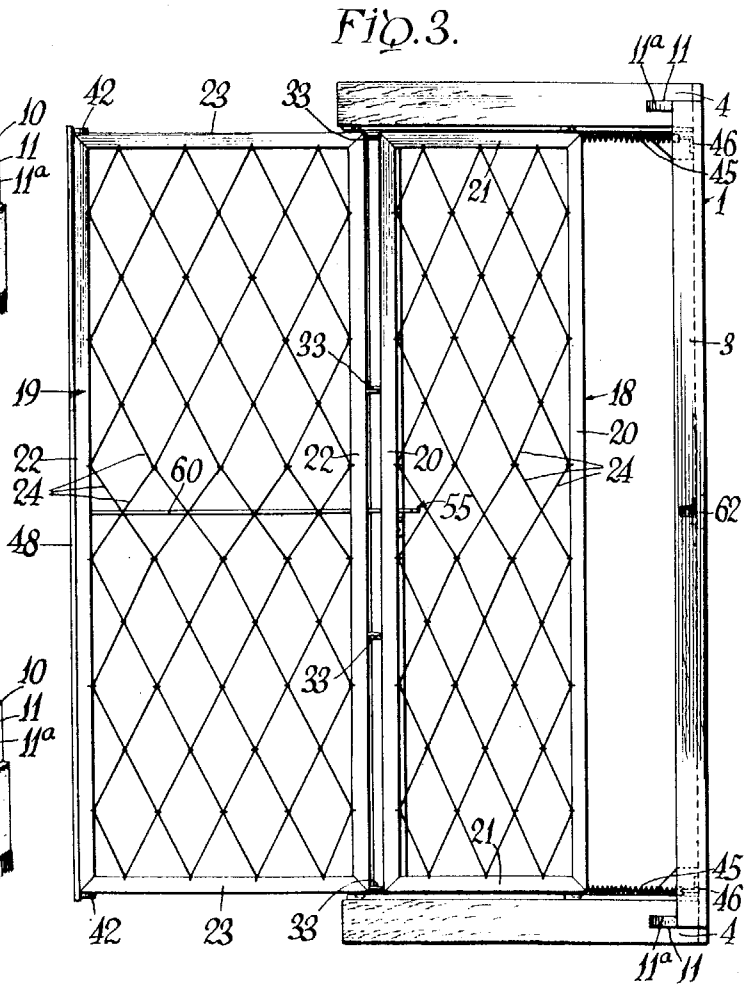
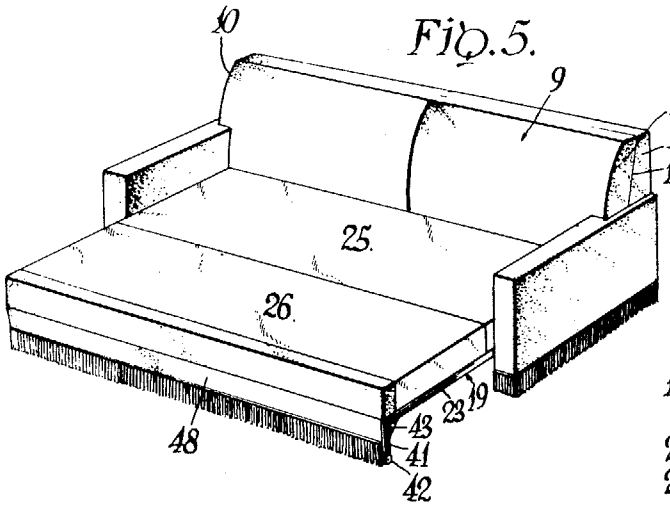
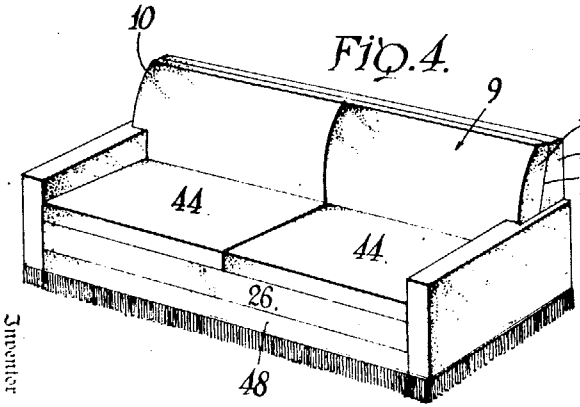
Inventor
Stanley A. Green.
By
Attorney

DAVENPORT BED

Original Filed April 21, 1951 4 Sheets-Sheet 4

Inventor
Stanley A. Green,
By
John Lowers
Attorney

United States Patent Office

Re. 23,955
Reissued Mar. 1, 1955

23,955

DAVENPORT BED

Stanley A. Green, Pittsburgh, Pa., assignor to Hill-Mar Industries Inc., Buffalo, N. Y., a corporation of New York Original No. 2,628,367, dated February 17, 1953, Serial No. 222,241, April 21, 1951. Application for reissue October 28, 1953, Serial No. 388,932

20 Claims. (Cl. 5—47)

Matter enclosed in heavy brackets [ ] appears in the original patent but forms no part of this reissue specification; matter printed in italics indicates the additions made by reissue.

This invention relates to improvements in articles of furniture of the type which have come to be known as davenport beds, that is to say a structure having movable mattress supporting frames which may be relatively folded or extended to provide for either davenport or bed phases of use.

The objects are to provide for maximum ease and facility in the conversion of the article from either phase to the other; to promote a maximum degree of comfort in the use of the article in either phase; to provide a combination of mechanical features which includes the movable mattress supporting frames and is characterized by extreme simplicity and manufacturing economy; and to provide for the permanent association with the movable supporting frames of *a* mattress [sections] in an arrangement whereby in the davenport phase [they are respectively] *it is* used for the direct support of seat cushions and of an upholstered back element and in the bed phase *is flat and may be* [are in adjoining coplanar relation to provide a mattress] of substantially the same width as the mattress of a standard double bed.

The invention, generally stated, consists in sundry novel features of construction, relation and operation pertaining to the mattress supporting frames and means for their support in either phase of use and their guidance during the conversion from either phase to the other. These features will be set forth in detail as the description proceeds.

In the accompanying drawings:

Figure 1 is a view in side elevation which assumes, for the purpose of clarity of illustration, the removal of an end wall of the main frame of the structure and which shows the parts in davenport relation, certain parts being broken away to enable the illustration of detail features.

Figure 2 is a view similar to Figure 1 and with the same assumption as in Figure 1, and shows the parts at the limit of their extension as a step in the conversion of the article from the davenport phase to the bed phase.

Figure 3 is a plan view showing the parts extended as in Figure 2, the mattress sections and the back element being removed in order to promote clarity of illustration.

Figure 4 is a perspective view of the article in the davenport phase.

Figure 5 is a perspective view of the article in the bed phase.

Figure 6 is a sectional view on the line 6—6 of Figure 1, looking in the direction of the arrows.

Figure 7 is a fragmentary plan view showing details of the mounting of a hinged panel which is provided at the front of the structure and is used for the control of certain latching features.

Figure 8 is an elevation of the hinged panel shown in Figure 7, looking at its inner face, the panel being partly broken away to accord with the limitation of drawing space.

Figure 9 is a fragmentary elevation of a pair of associated guide channels, such channels being provided at each end of the structure and the elevation being of those portions of the channels which are in adjoining relation and assuming that the article is in the bed phase.

Figure 10 is a perspective view, partly in section, and partly broken away, of a latching mechanism in its operative combination with the hinged panel shown in Figures 7 and 8, this figure assuming the relationship of the parts which is shown in Figure 2.

Figure 11:
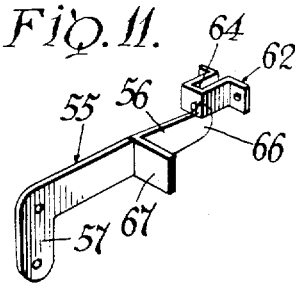
Figure 11 is a fragmentary perspective view showing elements of the latching mechanism which are in cooperation when the parts are in davenport relation.

The supporting element of the structure includes a back frame 1 of generally rectangular outline and end walls 2. The frame 1 carries a transversely extending top rail 3 and each end wall 2 carries an end rail 4 and a front rail 5. The end walls 2 are connected and mutually braced by the frame 1 and also by a transversely extending member 6. The vertical end bars of the frame 1 provide a pair of rear supporting legs 7 and the front rails 5 provide a pair of front supporting legs 8. The structure includes an upholstered back element 9 which in respect to its frame, spring and upholstery features may be of any suitable standard or known construction and, therefore, requires no illustration in detail.

The outer faces of all parts of the stationary supporting element, i. e., the faces which would otherwise be exposed to view, are, as shown in Figure 4, for the purpose of attractive appearance, preferably covered with finishing material of a kind and color which will match the seat cushions and the upholstered back element 9.

Figure 12:
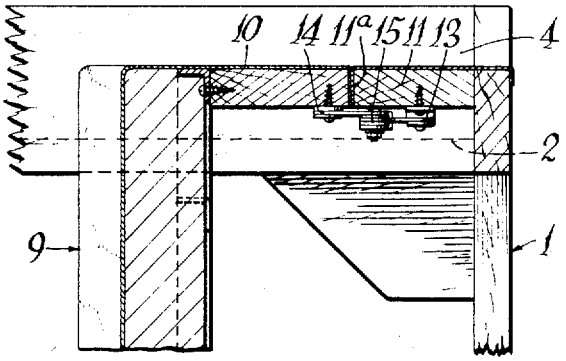
Figure 12 is a fragmentary horizontal sectional view on the line 12—12 of Figure 2.

The element 9 is provided with end wings 10 which are arranged above the rails 4 as best shown in Figures 4 and 5 and normally rest against supporting blocks 11 (Figures 2 and 12) arranged between the rails 3 and 4 and secured to the vertical end bars of the frame 1. The element 9 is connected to the rail 3 by suitable hinges 12 which are attached to the wings 10. Thereby the element 9 may have a normal lowered position in which its wings 10 rest against and receive support from the blocks 11 or a raised position as shown by broken lines in Figure 2, the back element being moved manually to its raised position prior to the conversion of the article from either phase of use to the other and thereafter, in either phase of use of the article, being returned manually to its normal position. The blocks 11 are co-planar with the [side] *end* walls 2 and may be considered as functional parts or extensions of the *end* [side] walls. Their front faces 11a against which the wings 10 normally rest are forwardly and downwardly inclined in conformity to the determined angle at which the back element 9 is supported. Means is provided for stably holding the back element in its raised position. Such means may be provided at either or both ends of the element and may be of any suitable character. As shown it consists of links 13 and 14, pivotally connected at their lower ends as at 15, the link 13 being pivotally connected at its upper end as at 16 to the block 11 adjacent its inner face and the link 14 being pivotally connected at its upper end as at 17 to the wing 10 adjacent its inner face. The pivotal connection 15 between the links 13 and 14 may be of any suitable and well known construction which will cause the overlying terminal portions of the link to bear with such degree of frictional pressure against one another as will insure the stable retention of the back element in either of its positions. Such pivotal connections usually include springs and frictional washer features and are so well known that the illustration of their details is not required.

According to the invention the structure includes two *preferably* rectangular inner and outer mattress supporting frames 18 and 19. The inner frame 18 includes side bars 20 and end bars 21 and the outer frame 19 includes side bars 22 and end bars 23, the several frame bars being conveniently and preferably of angle iron cross section. The side bars are at right angles to the walls 2 and the end bars are parallel to them. Where, as shown, the mattress is to be substantially of double bed width the frame 18 is preferably somewhat narrower than the frame 19 in order that it may conform to the standard height and elevation of the back element 9 in the davenport phase of use, as will be later described in detail. Each of the frames 18 and 19 carries a mattress supporting fabric 24 which may be of any suitable known construction.

Figure 15:
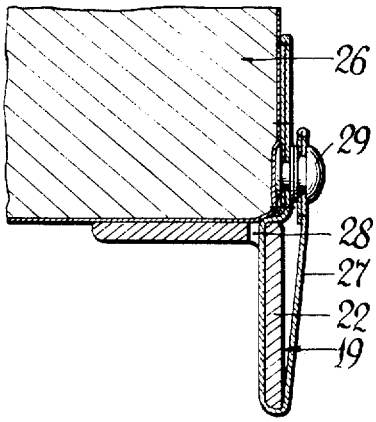
Figure 15 is a vertical sectional view on the line 15—15 of Figure 14, looking in the direction of the arrows.
Figure 14:
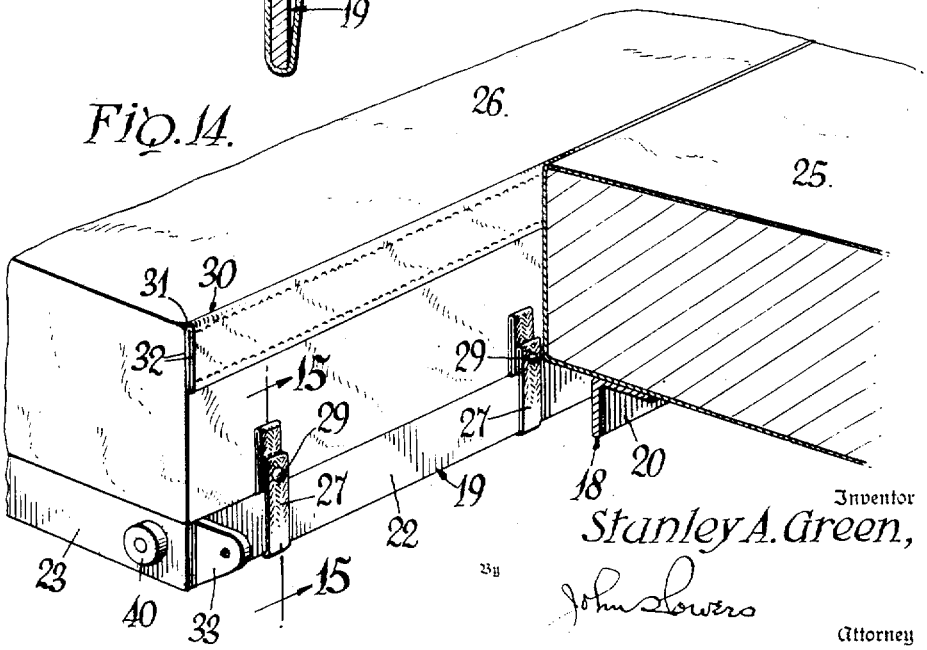
Figure 14 is a fragmentary perspective view showing the mattress sections in extended and co-planar relation, one of the mattress sections being partly broken away to permit the illustration of details of the connection between the mattress sections and of the connections between one of the mattress sections and its supporting frame.

As shown and preferred the mattress includes sections 25 and 26 which are respectively associated with and supported by the frames 18 and 19 and may be of any suitable construction, preferably that which includes cushioning springs (unnecessary to illustrate). The outer vertical face of the mattress section 26 which would otherwise be exposed to view is preferably covered with a strip of finishing material which matches the finishing material used for the rest of the structure. As extended in co-planar relation in the bed phase (Figure 2) the sections 25 and 26 adjoin and provide a mattress which, as assumed in the drawings, may be of substantially the same width as the mattress of a standard double bed. In the conversion of the structure from either phase of use to the other the mattress section 26 is immovable relatively to its supporting frame 19. For this purpose the section 26 is suitably attached to the frame 19. This attachment is preferably and conveniently made by means of a suitable number, e. g. six, of tie tapes 27 (Figures 14 and 15) which are determinately spaced from one another. Each tie tape is stitched at one end to the inner vertical face of the section 26 and its free end is passed through an opening 28 in the horizontal flange of the inner side bar 22 of the frame 19. The tie tape is looped about the vertical flange of the inner side bar 22 and its free end is secured to the body of the tie tape by a suitable fastener 29, e. g. a standard ball and socket fastener, one member of which is carried by the tape at its free end and the other member of which is carried by the body of the tape adjacent its point of attachment to the mattress 26. Whenever, for any reason, it may be desired to remove the mattress section 26 from its supporting frame 19 the elements of the fasteners 29 are disengaged, whereupon the section 26 may be freely lifted from the frame 19. Whereas the mattress section 26 is immovable relative to its supporting frame 19 the mattress section 25, during the conversion of the structure from either phase of use to the other, is preferably slidable upon its supporting frame 18, its sliding movement being in a fore and aft direction, i. e., in the direction of the end bars 21 of the frame 18.

Figure 13:
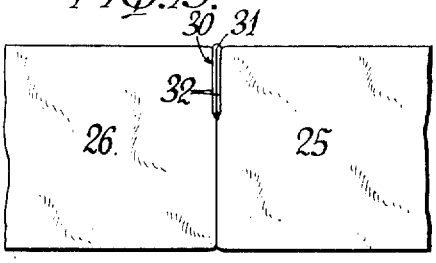
Figure 13 is a fragmentary end elevation of the mattress sections in extended relation, this figure showing in detail what may be called a hinged connection between them.

The mattress sections 25 and 26 are preferably in connected relation whereby during the conversion from either phase to the other they may have relative swinging movements. For this purpose the connection between these sections is in the nature of a hinge, so to speak, and may conveniently be of the construction shown in Figures 13 and 14. Thus the connection may consist of a flexible strip 30 which is bent upon itself along its center line as at 31 to provide leaves 32 which are located between the adjacent faces of the mattress sections and in each instance are attached by stitching to the adjacent mattress section, the strip 30 being coextensive in length with the mattress sections. The bow portion 31 of the bent and stitched strip 30 serves as a hinge axis whereby the sections, remaining in connected relation, may move angularly with respect to one another during the conversion of the structure from either phase of use to the other.

In the davenport phase the inner portion of the outer mattress section 26 extends under the inner side face of the inner mattress section 25 and provides bottom support for the inner mattress section.

The mattress supporting frames 18 and 19 are hingedly connected, the hinge connections 33 being provided between the adjacent side bars 20 and 22 and conveniently comprising lugs arranged in pairs and projecting from the vertical flanges of the bars and hinge pins fitted in the lugs. By virtue of the hinge connections 33 the frame 19 is utilized in both phases to provide support for the frame 18.

The frames 18 and 19 as connected by the hinges 33 are employed in combination with means for their support and guidance which is operatively connected to the supporting element and to the frames and is operative at all times within the confines of the supporting element. This means dictates the novel and advantageous relationship (to be presently described) of the hingedly connected frames 18 and 19 in both phases and their novel and advantageous relative movements during conversion from either phase to the other. The embodiment of the means for the support and guidance of the frames which is shown and preferred consists of stationary guides of channel cross section for each frame which have novel forms and arrangement and rollers carried by each frame which track in the channels of the companion guides.

The guides 34 for the frame 18 are attached to the side walls 2 (including the blocks 11) and are positioned adjacent the back frame 1. These guides are similarly formed and arranged in confronting relation and have straight components 35 which at their lower ends merge into forwardly and downwardly extending curved components 36. The straight components 35 at their upper ends adjoin the back frame 1 and from their upper ends are inclined at a suitable angle to the perpendicular in a forward and downward direction. The end bars 21 of the frame 18 carry rollers 37 which track in the guide rails 34 and are located adjacent the outer ends of the bars 21. Thereby in the davenport phase they are adjacent the then upper side of the frame 18 and in the bed phase are adjacent the then rear side of the frame 18. The channels of the guides 34 are closed at their lower ends by blocks 38 (Figure 9) which provide stops for engagement by the rollers 37, thereby positively to limit the extension of the sections in the conversion to the bed phase.

The guides 39 for the frame 19 are attached to the side walls 2 and are similarly formed and arranged in confronting relation, being straight and extending at a slight degree of angularity in a rearward and downward direction from points adjacent the front rails 5 to points suitably beyond the forwardly located lower ends of the guides 34. The lower ends of the guides 34 are immediately above, and in adjoining relation to, the guides 39. The front ends of the guides 39 are located in a common horizontal plane with the lower ends of the guides 34 as indicated by the broken line X in Figure 1. The end bars 23 of the frame 19 carry rollers 40 located at their rear or inner ends and which track in the guide rails 39, thereby at all times providing support for the frame 19 at its rear or inner side. Support for the frame 19 at its front or outer side is provided by depending legs 41 which carry floor engaging casters 42 and are preferably of angle iron cross section and butt welded to the vertical flanges of the frame bars at the front corners of the frame. The legs may be reinforced by gusset plates 43.

In the davenport phase (Figure 1) the inner frame 18 extends upwardly and preferably rearwardly at a suitable angle from the outer frame 19 and its then upper side has lateral support by means of the rollers 37 from the upper ends of the guides 34. The then lower side of the inner frame 18 has direct support from the inner side of the outer frame 19 by means of the hinge connection 33. The outer frame 19 is confined wholly between the side walls 2, its rear or inner side being supported by means of the rollers 40 from the inner end portions of the guides 39 and its front or outer side being supported by the legs 41. The mattress section 25 is arranged immediately behind the back element 9, its upper portion being confined in the recess provided by the top of the back element and the wings 10 and its lower portion being confined between the side walls 2. Thereby the mattress section 25 is wholly concealed from view and is supported by the frame 18 in an inclined plane parallel to the plane of the frame. The mattress section 25 provides support for the body portion of the back element, i. e. the portion which extends between the wings 10. It will be noted that the back element 9 in its lowered position has a forward and downward inclination from top to bottom which conforms to the inclination of the mattress section 25 and which has a degree of angularity that is conducive to comfort. The frame 19 occupies a plane which is common to the plane of the guides 39. Thereby the frame 19 has a rearward and slightly downward inclination and the mattress section 26 has a similar rearward and downward inclination. The lower side of the back element 9 is immediately above the mattress section 26 and the lower portion of the back element 9 is located in front of the lower portion of the mattress section 25 and behind the seat cushions 44 which the mattress section supports. The rearward and downward inclination of the frame 19 in the davenport phase which results in a similar inclination of the seat cushions at a suitable angle to the inclined back element 9 promotes comfort in the use of the article as a settee or divan.

In the bed phase (Figure 2) the inner or rear side of the outer frame 19 is supported by the rollers 40 from the front end portions of the guides 39 and the outer or front side of the frame 19 is supported by the legs 41 from the floor. As thus supported the outer frame 19 has a truly horizontal position which results in the horizontal positioning of the mattress section 26. The inner frame 18 is supported at its then rear side by the rollers 37 from the lower end portions of the guides 34 (Figures 2 and 9) and at its front or inner side is directly supported from the frame 19 by means of the hinge connections 33. Thereby the frame 18 occupies a truly horizontal plane which is coincident with the plane X (Figure 1) with the resultant positioning of the mattress section 25 in a plane truly horizontal and which may be considered as an extension of the plane of the mattress section 26. The mattress provided by the sections 25 and 26 is of ample width and affords a flat and substantially uninterrupted supporting surface upon which the bed-clothes may be arranged.

When the article is to be converted from the davenport phase to the bed phase the seat cushions 44 are removed and the back element 9 is raised to a suitable extent about its hinges 12 as shown in broken lines in Figure 2. In the preferred embodiment herein illustrated the initial phase of the extension of the frames 18 and 19 is effected by gravity, thereby facilitating the conversion and reducing the physical effort. As extending upwardly and rearwardly and thereby because of the favorable angularity of its position the frame 18 under its own weight, and aided by the vertical component of the weight of the mattress section 25, has an initial movement which is transmitted to the frame 19 and the mattress section 26 which it supports. This movement of the frame 18 is of compound character, its rear side having a component of downward sliding movement in the direction of the straight components 35 of the rails 34 and a component of forward pivotal movement about the axes of the rollers 37. The pivotal movement is prescribed by the connection of the frame 18 through the hinges 33 to the frame 19 and results from the fact that the inner or then lower side of the frame 18 follows the inner side of the frame 19 as it travels outward by means of the rollers 40 along the guide rails 39.

The initial movement of the frames 18 and 19 as effected by gravity may be ultimately arrested by suitable counterpoise means which may conveniently consist of helical springs 45 arranged adjacent the inner faces of the side walls 2 with their ends connected to brackets 46 and 47, the brackets 46 being mounted upon the lower bar of the back frame 1 and the brackets 47 being attached to and depending from the end bars 23 of the frame 19. At the start of the gravity-effected movement of the frames 18 and 19 the springs 45 are relatively loose, that is to say are not under tension. As the outward movement of the frame 19 continues the springs 45 are gradually and progressively tensioned until a degree is reached at which the extension of the frames by gravity will be arrested. At such time the operator inserts his hand under the mattress section 26 at its front side and grasps the front side bar 22 of the section 19, using this bar as a handle and pulling the section 19 outward to the full permissible extent. The section 18 follows the section 19 in such movement and at the completion of its movement occupies a horizontal plane in which it is supported by the lower end portions of the guides 34 through the rollers 37 and by the hinge connections 33, all as above explained. The physical effort required to move the mattress sections to their fully extended positions is comparatively slight, due in part to the lightness of the tension of the springs 45 and in greater part to the favorable outline of the path of movement of the rollers 37 of the frame 18, this outline being characterized by the comparatively gentle curvature and forward direction of the curved components 36 of the guides 34 and their merger without any sharp angularity with the lower ends of the straight components 35 of the guides 34.

The mattress section 26 has no movement relative to the frame 19 and participates in its movements during conversion to either phase. Thereby, through the hinge connection 31, the mattress section 26 in conversion to the bed phase exerts a pulling action upon the mattress section 25 with resultant movement thereof relatively to the frame 18 in a direction toward the inner side bar 20. When the frames 18 and 19 are fully extended the mattress section 25 rests squarely upon the frame 18. The sliding action of the mattress section 25 relatively to the frame 18 may be facilitated by facing the horizontal flanges of the frame bars 20 and 21 with plywood (unnecessary to illustrate). The frame bars 22 and 23 of the frame 19 may be similarly faced with plywood in order to insure the true coplanar relation of the sections 25 and 26 in the bed phase.

In the davenport phase the weight of the frame 18 and the mattress section 25 which is utilized to initiate the extension movement of the frames is opposed by a suitable latch which positively maintains the parts in davenport relation. When the frames are extended to the limit of their outward movement in the conversion to the bed phase the tension of the springs 45 is opposed by a latch which positively maintains the frames at the outward limit of their extension movement as shown in Figure 2. The latching action is effected automatically and the unlatching action is effected manually.

The latching elements are operatively connected to a pivotally hung panel board 48 which is arranged at the front of the structure and, as shown, may be coextensive in length with the mattress supporting frame 19. The board 48 is provided at its ends adjacent its upper edge (Figures 1 and 7) with inwardly projecting ears 49 to accommodate pivot pins 50 by which it is connected to the forward ends of the end bars 23 of the frame 19. The board 48 also has value from the standpoint of appearance in that it extends below the frame 19 to a line quite close to the casters 42 and thereby, in the davenport phase, conceals the legs 41 and the parts below the frame 19. The board 48 is preferably covered with finishing material of the same kind and color that is used for the rest of the structure. The pivotal suspension of the board 48 is utilized in connection with the action of the latch mechanism for which reason it is necessary that the board be maintained in a normal plane coincident, as a matter of appearance, with the common plane of the legs 8. This is conveniently accomplished by opposed inner and outer helical compression springs 51 and 52 which are preferably provided in connection with each of the legs 41. The springs of each pair are respectively arranged adjacent the inner and outer faces of the front flanges of the leg 41 and are mounted upon a stem 53 carried by and projecting rearwardly from the board 48, the front flange of the associated leg 41 having an opening for the accommodation of the stem and which is of suitably larger diameter. At its rear end the stem carries a washer 54 which is backed by a securing nut. The spring 51 reacts against the washer 54 and the inner face of the front flange of the leg 41 and the spring 52 reacts against the board 48 and the outer face of the front flange of the leg 41.

In the construction preferred a movable element 55 (Figure 10) is common to both latch mechanisms, this element being of L-shaped outline and having a rearwardly projecting arm 56 and a downwardly projecting arm 57. The element 55 is pivotally mounted between ears 58 which are carried by the inner or rear side bar 22 of the frame 19 and project below the frame. The ears 58 are located approximately at the center of the bar 22 and the pivot 59 of the element 55 is located at the elbow formed by the junction of the arms 56 and 57. The arm 57 at its lower end is pivoted to a link 60 by which it is operatively connected to the board 48, the opposite or forward end of the link 60 being secured with a measure of loose play to a bracket 61 attached to the board 48 adjacent its inner face. When the board 48 is swung outward from its normal position the arm 56 is lowered about its pivot 59 and when swung inward the arm 56 is raised. The arm 56 is formed for cooperation with keepers 62 and 63 (Figures 10 and 11), the keeper 62 being attached to the lower cross bar of the frame 1 and providing a shoulder 64 and the keeper 63 being attached to the transverse brace member 6 and provided with a tooth-like shoulder 65 having its upper surface of inclined cam outline. The arm 56 is provided with a terminal hook 66 for engagement behind the shoulder 64 and with a laterally projecting finger 67 for engagement behind the shoulder 65. In the davenport phase the arm 56 cooperates with the keeper 62 and when the frames 18 and 19 are at the extreme limit of their extension movement during their conversion to the bed phase the arm 56 cooperates with the keeper 63.

In the conversion to the bed phase the seat cushions 44 are removed and the back element 9 is then raised as above explained. Thereupon the operator grasps the lower portion of the board 48 and pulls it outward against the pressure of the springs 51. This outward movement is very slight in degree but is sufficient to lower the arm 56 (which at that time extends below the shoulder 64) until the hook 66 is moved beyond and below the shoulder 64. Thereupon the frame 18 immediately becomes self-active in initiating the gravity-effected phase of the extension movement of the connected supporting frames, all as above explained.

The element 55 participates in the movement of the frame 19 and as the frame, under the pull of the operator, nears the extreme limit of its outward or extension movement (which is prescribed by the engagement of the rollers 37 against the blocks 33 as shown in Figure 9) the finger 67 (the arm 55 being maintained in a mean position by the springs 52 and 53) will ride over the cammed upper edge of the shoulder 65. As the frame 19 reaches its extreme limit of outward movement the finger 67 passes beyond the shoulder 65 and the arm 55 drops, engaging the finger 67 behind the shoulder. Thereby both frames are held, in opposition to the tension of the springs 45, at the extreme limit of their outward movement. This relationship is shown in Figures 2 and 10.

The limit of the outward extension movement of the frames 18 and 19 is selected to permit the last step in the conversion *to* [of] the bed phase, namely the movement of the back element 9 by the operator from its raised position to its fully lowered position in which the wings 10 abut the inclined front faces of the blocks 11, the back element in such movement clearing the mattress section 25. The back element 9 is shown in its lowered position in Figure 2 and, with the frames 18 and 19 held at the extreme limit of their outward movement, a space S intervenes between the rear vertical face of the mattress section 25 and the adjacent lower portion of the back element 9. This space promotes convenience in arranging the bedclothes. When this has been done the operator effects the final step in the conversion to the bed phase. For the purpose of this final step the guides 34 terminate in relatively short and straight extensional components 68 (Figure 9) with which the curved components 36 merge at their lower ends, the components 68 being substantially parallel to the guides 39. In the final step of the conversion to the bed phase the operator grasps the lower portion of the board 48 and pushes it inward against the pressure of the springs 52. This inward movement is very slight in degree but is sufficient to raise the arm 56 (which at that time extends above the keeper 63) until the finger 67 is moved beyond above the shoulder 65. Thereupon the springs 45 immediately act to effect a rearward movement of the frames 18 and 19 which occludes the space S and is arrested by the lower portion of the back element 9, this rearward movement being sufficiently indicated in Figure 2 by the broken line Y. When the frames 18 and 19 have been moved back to the position indicated by the line Y they will assume relative positions in which they are substantially in a common horizontal plane. With the frames positioned as indicated by the line Y the springs 45 will remain under tension and thereby serve an added advantage, viz., of causing the parts of the bedclothing which hang beyond the rear vertical face of the mattress section 25 to be, in effect, clamped with an appropriate degree of pressure between the mattress section 25 and the lower portion of the back element 9.

In conversion from the bed phase to the davenport phase the first step is to pull the mattress supporting frames back to the limit of their outward or extension movement where they are again held by the engagement of the finger 67 with the shoulder 65 of the keeper 63.

The back element 9 is then swung from its lowered position to a raised position as indicated in broken lines in Figure 3. The operator then manipulates the board 48 to disengage from the keeper 63 at which time the springs 45 initiate the return movements of the frames 18 and 19. When the tension of the springs 45 decreases to a point where they are no longer effective in moving the frames 18 and 19 the operator, grasping the front side bar 22 of the frame 19, pushes the frames home, that is to say into the relation shown in Figure 1 and above described in detail. The physical effort required for this operation is comparatively slight, due to the direct application of force by the frame 19 to the frame 18 and the easy movements of the rollers 37 from the lower to the upper ends of the guides 34 and of the frame 18 with relation to its hinges 33 and the axes of the rollers 37. When the return or folding movements of the frames 18 and 19 have been completed the hook 66, by virtue of the springs 51 and 52, is engaged behind the shoulder 64 of the keeper 62 and positively latches the mattress supporting frames in their folded relation. During the relative swinging of the frames 18 and 19 in the final stage of their return movement the mattress section 26 pushes the mattress section 25. Since the mattress sections have a suitable degree of yielding capacity and their casings are flexible they readily assume the relationship shown in Figure 1 in which the mattress section 25 in effect rests upon the inner portion of the mattress section 26 as a bottom support, the pivot 31 by reason of the yielding capacity of the sections and the flexibility of their casings being shifted to a short extent to meeting points along the inner or then bottom face of the mattress section 25 and along the top face of the section 26. When the supporting frames 18 and 19 are completely folded and latched the back element 9 is restored to its fully lowered position and the seat cushions 44 are replaced upon the mattress section 26.

The invention has been shown and described as a davenport bed for the reason that its use in this capacity will be its principal use. However, in the furniture industry another convertible article of furniture is known as a "sleep chair" and is an article which can be converted from a chair to a single bed. Generally speaking davenport beds and sleep chairs may be constructed to operate with similar parts and on similar principles. It will, therefore, be understood that the term "davenport" is used herein and in the claims as a matter of convenience and with the intent of encompassing a davenport strictly so called or a chair.

I claim:

1. An article of furniture having davenport and bed phases of use including, in combination, a supporting element consisting of a vertical back frame and end walls connected and braced by the back frame, inner and outer rectangular mattress supporting frames movably mounted between the end walls and each having side bars extending at right angles to the end walls and end bars extending parallel to the end walls, hinge connection between the adjacent inner side bars of the supporting frames, the outer supporting frame having depending wheel-carrying floor engaging legs adjacent its front side, a first pair of similarly formed and arranged confronting guide rails for the inner supporting frame adjacent the ends thereof, a second pair of similarly formed and arranged confronting guide rails for the outer supporting frame adjacent the ends thereof, one of the guide rails for each frame being arranged between an end bar and an end wall of the supporting element and being attached to said end wall, the guide rails of the first pair being positioned with their upper ends adjacent the back frame and extending from their upper ends in a direction of forward and downward inclination, the guide rails of the second pair being straight and extending from the front of the side walls rearwardly at a slight downward inclination to points below the guide rails of the first pair, the guide rails of the second pair and the said floor engaging legs cooperating to hold the outer mattress supporting frame in a position in the davenport phase in which it provides support for the seat cushions and also cooperating to support it for movement in a forward or rearward direction according to the phase to which the article is to be converted, the lower terminal portions of the guide rails of the first pair being located above and in adjoining relation to the guide rails of the second pair and being in a common horizontal plane with the forward ends of the guide rails of the second pair, the end bars of the supporting frames being provided with rollers which track in the guide rails of the respective pairs, the inner supporting frame in the davenport phase extending in an upward and rearward direction from the inner side of the outer supporting frame with its upper portion by means of its rollers receiving lateral support from the guide rails of the first pair and its lower portion by means of the hinge connections receiving direct support from the inner side of the outer supporting frame, the frames being simultaneously forwardly movable in the conversion from the davenport phase to the bed phase and rearwardly movable in the conversion from the bed phase to the davenport phase, the frames upon the completion of the conversion to the bed phase being in a common horizontal plane, the movement of the inner frame in either direction between its positions in the davenport phase and the bed phase having pivotal components about the axes of the hinge connections and of its rollers, the outer frame in the bed phase having its inner side supported by the front end portions of the guide rails of the second pair and the inner frame in the bed phase having its outer side supported in the terminal portions of the guide rails of the first pair, the forward and downward inclination of the guide rails of the first pair and the angular relation of the mattress supporting frames in the davenport phase being such that the inner mattress supporting frame is movable by gravity to initiate the forward movement of the frames in conversion to the bed phase, and manually releasable means acting in the davenport phase in opposition to the weight of the inner mattress supporting frame for maintaining the mattress supporting frames in their positions of angular relation in the davenport phase.

2. An article of furniture as set forth in claim 1 wherein separate outer and inner mattress sections are mounted upon the respective outer and inner supporting frames and at their adjacent sides and at a point adjacent their supporting surfaces are connected together in a manner which will permit their relative swinging movement, the outer mattress section being immovable upon the outer supporting frame and the inner mattress section during the conversion from either phase of use to the other having a sliding movement upon the inner supporting frame in either direction of the end bars of such frame, the connection between the mattress sections causing the outer mattress section to exert a pull upon the inner mattress section during the conversion from the davenport phase to the bed phase and permitting the outer mattress section to extend under the inner side of the inner mattress section in the davenport phase, the outer mattress section at such time providing bottom support for the inner mattress section.

3. An article of furniture as set forth in claim 1 wherein the supporting element is provided with a forwardly extending top rail, separate outer and inner mattress sections are mounted upon the respective outer and inner supporting frames, and an upholstered back element is hingedly connected at its upper side to the front edge of the top rail and is movable between raised and lowered positions, the back element occupying its lower position in both phases and in the davenport phase extending in front of and concealing the inner mattress section, the outer edge of the back element in the davenport phase being above and adjacent the upper surface of the outer mattress section.

4. An article of furniture as set forth in claim 1 wherein the supporting element is provided with a forwardly extending top rail and with blocks located under the top rail and adjacent the back frame, the blocks forming functional upward continuations of the side walls, separate outer and inner mattress sections are mounted upon the respective outer and inner supporting frames, and an upholstered back element is hingedly connected at its upper side to the front edge of the top rail and is movable between raised and lowered positions, the back element having rearwardly extending wings at its ends which in the lower position of the back element adjoin the front faces of the blocks, the wings and the top of the back element providing a recess, the back element occupying its lower position in both phases and in its lower position in the davenport phase having its portion beyond the wings extending between the side walls, the inner mattress in the davenport phase being located behind and concealed by the back element and extending into the recess, the outer edge of the back element in the davenport phase being above and adjacent the upper surface of the outer mattress section, and the inner supporting frame, the inner mattress section and the back element extending from their upper ends at similar degrees of forward and downward inclination, the portion of the back element between the wings receiving support from the inner mattress section.

5. An article of furniture as set forth in claim 1 wherein a mattress is mounted upon the supporting frames, an upholstered back element is connected to the supporting element for movement between raised and lowered positions, and the frames have an extreme limit of extension movement which enables the back element to be moved to its lowered position clear of the mattress and which provides a space between the rear side of the mattress and the back element, such space affording facility in the arrangement of the bedclothes, the supporting frames being movable in the conversion to the bed phase from the extreme limit of their extension movement to a position wherein the space is occluded and the mattress adjoins the lower portion of the back element and cooperates with it in clamping the bed clothing.

6. An article of furniture as set forth in claim 1 wherein a mattress is mounted upon the supporting frames, an upholstered back element is connected to the supporting element for movement between raised and lowered positions, the frames have an extreme limit of extension movement which enables the back element to be moved to its lowered position clear of the mattress and which provides a space between the rear side of the mattress and the back element, such space affording facility in the arrangement of the bedclothes, the supporting frames being movable in the conversion to the bed phase from the extreme limit of their extension movement to a position wherein the mattress occludes the space and adjoins the lower portion of the back element, manually releasable means is provided for latching the frames at the extreme limit of their extension movement, and means is provided which is operable with tension effect when the latching means is disengaged to move the frames backward, thereby to occlude the space and to cause the mattress to abut the back element and also to cause the mattress and the portion of the back element behind it to act with clamping effect upon the parts of the bed clothes which hang beyond the inner face of the mattress.

7. An article of furniture as set forth in claim 1 wherein the angular position of the inner supporting frame in the davenport phase is such that said frame will act by gravity to initiate the extension movement of the frames in the conversion from the davenport to the bed phase, manually releasable means is provided for latching the frames in the positions which they occupy in the davenport phase, yieldable counterpoise means is connected to the supporting element and to one of the frames for limiting the extension movement of the frames as effected by gravity at a stage prior to its completion, a mattress is mounted upon the supporting frames, an upholstered back element is connected to the supporting element for movement between raised and lowered positions, the frames having an extreme limit of extension movement which enables the back element to be moved to its lowered position clear of the mattress and which provides a space between the rear side of the mattress and the back element, such space affording facility in the arrangement of the bed clothes, the supporting frames being movable in the conversion to the bed phase from the extreme limit of their extension movement to a position wherein the mattress occludes the space and adjoins the lower portion of the back element, and manually releasable means is provided for latching the frames at the extreme limit of their extension movement, the counterpoise means being operative when the last named latching means is disengaged to move the frames backward to occlude the space and to cause the mattress to abut the back element and also to cause the mattress and the portion of the back element behind the mattress to act with clamping effect upon the parts of the bed clothes which hang beyond the inner face of the mattress.

8. An article of furniture as set forth in claim 1 wherein the angular position of the inner supporting frame in the davenport phase is such that said frame will act by gravity to initiate the extension movement of the frames in the conversion from the davenport to the bed phase, manually releasable means including a movable latching element is provided for latching the frames in the positions which they occupy in the davenport phase, a panel board is hingedly connected to the outer mattress frame adjacent its front side bar and is pendant from the frame and conceals the legs, spring means is provided for holding the board in a mean position wherein the movable latching element is operative, and a link connects the board and the movable latching element.

9. An article of furniture as set forth in claim 1 wherein the angular position of the inner supporting frame in the davenport phase is such that said frame will act by gravity to initiate the extension movement of the frames in the conversion from the davenport to the bed phase, yieldably counterpoise means is connected to the supporting element and to one of the frames for limiting the extension movement of the frames as effected by gravity at a stage prior to its completion, a mattress is mounted upon the supporting frames, an upholstered back element is connected to the supporting element for movement between raised and lowered positions, the frames having an extreme limit of extension movement which enables the back element to be moved to its lowered position clear of the mattress and which provides a space between the rear side of the mattress and the back element, such space affording facility in the arrangement of the bed clothes, the supporting frames being movable in the conversion to the bed phase from the extreme limit of their extension movement to a position wherein the mattress occludes the space and adjoins the lower portion of the back element, a first means is provided for latching the frames in the positions which they occupy in the davenport phase, a second means is provided for latching the frames at the extreme limit of their extension movement, the two latching means including a common movable latching element, a panel board is hingedly connected to the outer mattress frame adjacent its front side and is pendant from the frame and conceals the legs, spring means is provided for holding the board in a mean position wherein the movable latching element is operative, and a link connects the board and the movable latching element whereby the board may be moved manually in opposition to said spring means in order to effect a disengaging movement of the movable latching element in connection with either of the latching means.

10. An article of furniture as set forth in claim 9 wherein the panel board carries rearwardly projecting stems, the legs are formed with openings through which the stem projects, the spring means in each instance includes a pair of compression springs mounted on the stem and arranged respectively adjacent the front and rear sides of the leg, and a collar is provided at the inner end of the stem, one of the compression springs reacting between the outer face of the leg and the inner face of the panel board and the other compression spring reacting between the inner face of the leg and the collar.

11. An article of furniture as set forth in claim 9 wherein the panel board carries rearwardly projecting stems, the legs are formed with openings through which the stem projects, the spring means in each instance includes a pair of compression springs mounted on the stem and arranged respectively adjacent the front and rear sides of the legs, a collar is provided at the inner end of the stem, one of the compression springs reacting between the outer face of the leg and the inner face of the panel board and the other compression spring reacting between the inner face of the leg and the collar, the first and second latching means each includes a latching shoulder, the common movable latching element engaging the latching shoulder of the first latching means from below and engaging the latching shoulder of the second latching means from above, and the panel board is movable about its hinges in one direction to cause the movable latching element to disengage the shoulder of the first latching means and in the opposite direction to cause the movable latching element to disengage the shoulder of the second latching means.

12. An article of furniture having davenport and bed phases of use including, in combination, a supporting element consisting of a vertical back frame and end walls connected and braced by the back frame, inner and outer rectangular mattress supporting frames movably mounted between the end walls and each having side bars extending at right angles to the end walls and end bars extending parallel to the end walls, *the side bars and end bars of each frame being coplanar and the end bars being continuous and rigid,* the outer supporting frame having wheel carrying floor engaging legs adjacent its front side, hinge connections between the adjacent inner side bars of the supporting frames and which at all times serve for the direct support of the inner frame by the outer frame, separate outer and inner mattress sections mounted upon and movable with the supporting frames, an upholstered back element connected to the supporting element for movement between raised and lowered positions, and means of support and guidance for the supporting *frames* [frame] operatively connected to the supporting element and to the supporting frames, such means being at all times operative within the confines of the supporting element and cooperative with the hinge connections and the legs and being operative in the davenport phase to hold the inner supporting frame in a position in which it extends upwardly from the outer supporting frame and in which the inner mattress section which it supports is behind and concealed by the back element in its lowered position and furnishes direct support for the back element in its lowered position and *serves* to hold the outer supporting frame in a position in which it projects forwardly from the inner supporting frame with the outer mattress section adjoining the inner mattress section and serving as the direct support for seat cushions placed in front of the back element, the means being operative in the conversion *to* [of] the bed phase to cause a forward direction of movement of the outer supporting frame and an accompanying movement of the inner supporting frame with forwardly directed rectilinear and pivotal components and being operative upon the completion of the conversion to the bed phase to hold the supporting frames horizontally co-planar with the mattress sections, the supporting frames being movable in reverse order in conversion to the davenport phase and the means being operative upon the supporting frames similarly but in reverse order during their movement in conversion to the davenport phase.

13. An article of furniture as set forth in claim 12 wherein the angular position of the inner supporting frame in the davenport phase is such that said frame will act by gravity to initiate the extension movement of the frames in the conversion from the davenport to the bed phase, and a manually releasable element is provided for latching the frames in the positions which they occupy in the davenport phase.

14. An article of furniture as set forth in claim 12 wherein the separate outer and inner mattress sections are connected together at their adjacent sides and at a point adjacent their supporting surfaces in a manner which will permit their relative swinging movement, the outer mattress section is immovably mounted upon the outer supporting frame and the inner mattress section is slidably mounted upon the inner supporting frame and during conversion from either phase of use to the other has a sliding movement upon the inner supporting frame in either direction of the end bars of such frame, the connection between the mattress section causing the outer mattress section to exert a pull upon the inner mattress section during the conversion from the davenport phase to the bed phase and permitting the outer mattress section to extend under the inner side of the inner mattress section in the davenport phase, the outer mattress section at such time providing bottom support for the inner mattress section, *the back element being movable to its raised position to permit the movement of the inner supporting frame as directed by the means of support and guidance during the conversion from the davenport phase to the bed phase and from the bed phase to the davenport phase.*

15. An article of furniture as set forth in claim 12 wherein the angular position of the inner supporting frame with respect to the outer supporting frame in the davenport phase is such that said inner supporting frame will tend to act by gravity to initiate the extension movement of the frames in conversion to the bed phase and the means for the support and guidance of the supporting frames consists of a first pair of fixed confronting guide rails for the inner supporting frame extending forwardly and downwardly from points adjacent the back frame of the supporting element, a second pair of fixed straight confronting guide rails for the outer supporting frame having their inner portions below and in adjoining relation to the lower terminals of the guide rails of the first pair and projecting forwardly from the guide rails of the first pair with their outer ends in horizontally coplanar relation to the lower terminals of the guide rails of the first pair, the guide rails being severally secured to the end walls of the supporting element, and rollers provided at the ends of each supporting frame and tracking in the companion guide rails of the frames.

16. An article of furniture as set forth in claim 12 wherein the means for the support and guidance of the mattress supporting frames includes a stop cooperating with a part carried by one of the frames and positioned to limit the movement of the frames in conversion to the bed phase at a point in which they are horizontally coplanar and the inner frame is positioned to permit the back element to be swung downwardly clear of the inner mattress section to its fully lowered position in which its lower portion is behind the rear vertical face of the inner mattress section, the back element and the rear vertical face of the inner mattress section in the position of the frames so limited delimiting a space which affords facility in the arrangement of the bed clothes, the frames when the back element is lowered being movable in the opposite direction from the position so limited and in horizontally co-planar relation, thereby to occlude the space and to cause the inner mattress section to abut the lower portion of the back element as a stop for such retrogade movement of the frames, the rear vertical face of the inner mattress section being then in adjoining relation to the lower portion of the back element and the inner mattress section thereby cooperating with the back element in exercising clamping pressure upon the portions of the bed clothes which were introduced into the space.

*17. An article of furniture having davenport and bed phases of use, including in combination, a supporting element consisting of a vertical back frame and end walls connected and braced by the back frame, inner and outer adjacent mattress supporting frames movably mounted between the end walls and each having connected coplanar and rigid end bars extending parallel and adjacent to the end walls, the outer supporting frame having wheel carrying floor engaging legs adjacent its front side, hinge connections between adjacent parts of the supporting frames and which at all times serve for the direct support of the inner frame by the outer frame, a mattress supported upon and having portions overlying and movable with the respective supporting frames, the mattress conforming in outline to the angular relationship of the supporting frames in the respective davenport and bed phases of use, an upholstered back element connected to the supporting element for movement between raised and lowered positions, and means of support and guidance for the supporting frames operatively connected to the supporting element and to the supporting frames, such means being at all times operative within the confines of the supporting element and cooperative with the hinge connections and the legs and being operative in the davenport phase to hold the inner supporting frame in a position in which it extends upwardly from the outer supporting frame and in which the portion of the mattress overlying the inner mattress frame is behind and concealed by the back element in its lowered position and furnishes direct support for the back element in its lowered position and serves to hold the outer supporting frame in a position in which it projects forwardly from the inner supporting frame with the portion of the mattress overlying the outer mattress frame extending forward from the portion of the mattress overlying the inner frame and serving as the direct support for seat cushions placed in front of the back element, the means being operative in the conversion to the bed phase to cause a forward direction of movement of the outer supporting frame and an accompanying movement of the inner supporting frame with forwardly directed*

*rectilinear and pivotal components to positions, at the completion of the conversion to the bed phase in which the supporting frames are horizontally coplanar and are supported in that relation by the means of support and guidance in cooperation with the said wheel carrying floor engaging legs, the supporting frames being movable in reverse order in conversion to the davenport phase and the means being operative upon the supporting frames similarly but in reverse order during their movement in conversion to the davenport phase.*

*18. An article of furniture as set forth in claim 17 wherein the angular position of the inner supporting frame in the davenport phase is such that said frame will act by gravity to initiate the extension movement of the frames in the conversion from the davenport to the bed phase, and a manually releasable element is provided for latching the frames in the positions which they occupy in the davenport phase.*

*19. An article of furniture as set forth in claim 17 wherein the angular position of the inner supporting frame with respect to the outer supporting frame in the davenport phase is such that said inner supporting frame will tend to act by gravity to initiate the extension movement of the frames in conversion to the bed phase and the means for the support and guidance of the supporting frames consists of a first pair of fixed confronting guide rails for the inner supporting frame extending forwardly and downwardly from points adjacent the back frame of the supporting element, a second pair of fixed straight confronting guide rails for the outer supporting frame having their inner portions below and in adjoining relation to the lower terminals of the guide rails of the first pair and projecting forwardly from the guide rails of the first pair with their outer ends in horizontally coplanar relation to the lower terminals of the guide rails of the first pair, the guide rails being severally secured to the end walls of the supporting element, and rollers provided at the ends of each supporting frame and tracking in the companion guide rails, and manually releasable means is provided for latching the frames in the positions which they occupy in the davenport phase.*

*20. An article of furniture as set forth in claim 17 wherein the means for the support and guidance of the supporting frames consist of a first pair of fixed confronting guide rails for the inner supporting frame extending downwardly from points adjacent the back frame of the supporting element, a second pair of fixed straight confronting guide rails for the outer supporting frame having their inner portions below and in adjoining relation to the lower terminals of the guide rails of the first pair and projecting forwardly from the guide rails of the first pair with their outer ends in horizontally coplanar relation to the lower terminals of the guide rails of the first pair, the guide rails being severally secured to the end walls of the supporting element, and rollers provided at the ends of each supporting frame and tracking in the companion guide rails.*

References Cited in the file of this patent or the original patent

UNITED STATES PATENTS

| | | |
|---|---|---|
| 1,078,908 | Fischrupp | Nov. 18, 1913 |
| 1,166,315 | Bell | Dec. 28, 1915 |
| 2,288,775 | Bell | July 7, 1942 |
| 2,568,366 | Rosen | Sept. 18, 1951 |
| 2,628,368 | Gordon et al. | Feb. 17, 1953 |

FOREIGN PATENTS

| | | |
|---|---|---|
| 58,518 | Norway | Oct. 11, 1937 |
| 420,640 | Great Britain | Dec. 5, 1934 |
| 710,181 | France | June 1, 1931 |
| 746,856 | France | Mar. 14, 1933 |
| 777,748 | France | Dec. 5, 1934 |